Patented May 1, 1945

2,374,661

UNITED STATES PATENT OFFICE 2,374,661

MANUFACTURE OF ISOALLOXAZINE DERIVATIVES

Franz Bergel, Aaron Cohen, and John Wynne Haworth, Welwyn Garden City, England, assignors to Roche Products Limited, Welwyn Garden City, Hertfordshire, England No Drawing. Application April 24, 1942, Serial No. 440,400. In Great Britain July 16, 1941

6 Claims. (Cl. 260—211)

The synthesis of isoalloxazine derivatives such as riboflavin (vitamin $B_2$) has hitherto been carried out by the condensation of N-polyhydroxyalkyl-o-phenylenediamines with alloxan or related compounds (cf. Kuhn, Berichte der deutschen chemischen Gesellschaft, 1934, 67, 1939; Karrer, Helvetica Chimica Acta 1935, 18, 69; and British Specifications Nos. 441,692 and 457,984). Only in one instance does the synthesis start from a compound other than a N-mono-substituted o-diamine, i. e., Specification No. 441,692, describes inter alia a process in which a N-mono-substituted o-nitroamine is treated with a reducing agent such as tin, stannous chloride, iron or a trivalent titanium compound, in the presence of alloxan or its derivatives, and the resulting leuco compounds treated with dehydrogenating agents.

The present invention provides a simple process for the manufacture of isoalloxazine derivatives wherein 2-(N-alkyl- or polyhydroxyalkylamino)-azobenzene derivatives of the general formula:

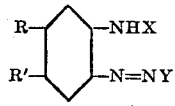

in which X represents an alkyl or polyhydroxyalkyl substituent, Y is an aromatic nucleus which may be substituted with substituents which do not interfere with the reaction, R and R' are alkyl substituents in the 4 and 5 positions, are treated with reduction products of alloxan such as alloxantin or dialuric acid.

Azo compounds of the aforesaid general formula are conveniently prepared by the coupling of 4:5-dialkyl-(N-alkyl or polyhydroxyalkyl)-phenylamines with a diazotised amine in the manner described by Karrer (Helvetica Chimica Acta, 1935, 18, 1130, and 1936, 19, 264).

The process can be carried out by treating, for example, an alcoholic solution of 2-(d-ribitylamino)-4:5-dimethylazobenzene with alloxantin, conveniently in the presence of a dehydrogenation-hydrogenation catalyst such as palladised charcoal, although the presence of a catalyst is not absolutely necessary, and in the presence of a suitable mineral acid. It is convenient to carry out the reaction in its earlier stage in a nitrogen atmosphere which is replaced by air towards the end of the condensation, but nitrogen is not absolutely essential. The desired isoalloxazine derivative can be obtained either by starting with a mixture of the azo compound and a reduction product of alloxan in the presence of an alcoholic solution of a suitable mineral acid, or the reaction can also be carried out by stirring a mixture of the azo compound with a reduction product of alloxan in alcoholic suspension until the red colour of the azo compound disappears, followed by addition of the suitable mineral acid, or finally, the reaction can be carried out by the addition of an alcoholic solution of the azo compound containing a suitable mineral acid to an alcoholic suspension of a reduction product of alloxan.

If desired the nitrogen can be replaced by hydrogen, when it is possible to replace the alloxantin by alloxan, since alloxan in the presence of hydrogen and a catalyst is itself reduced to alloxantin.

The following examples illustrate how the process of the invention may be carried into effect:

1. A mixture of 5 parts by weight of 2-(d-ribitylamino)-4:5-dimethylazo-benzene, 20 parts by weight of alloxantin, and 2 parts by weight of palladised charcoal in 800 parts by volume of ethyl alcohol are shaken in a nitrogen atmosphere at a temperature of 40–50° C. When the red colour of the azo compound has disappeared the nitrogen is replaced by air, 35 parts by volume of normal alcoholic hydrogen chloride are added and the reaction is completed by shaking a further 4 hours at 40–50° C. Crude riboflavin is obtained as a yellow-brown precipitate. The catalyst and the riboflavin are filtered, and the latter digested in dilute caustic soda solution. The catalyst is filtered off and the filtrate acidified with acetic acid, when the riboflavin separates as an orange-yellow solid. After crystallisation from hot water it melts at 282° C.

2. A mixture of 1 part by weight of 2-(d-ribitylamino)-4:5-dimethylazo-benzene, 1 part by weight of alloxantin, 9 parts by volume of normal alcoholic hydrogen chloride, and 0.2 part by weight of palladised charcoal in 100 parts by volume of ethyl alcohol are shaken in a hydrogen atmosphere until the dark bluish-green colour formed by addition of the acid to the alcoholic solution of the azo compound disappears, and a yellow-brown solution is formed. The reaction is then completed by replacing the hydrogen by air and shaking the mixture overnight at 40–50° C. The precipitated riboflavin and catalyst are then filtered, and the former purified as described in Example 1.

3. A mixture of 5.4 parts by weight of 2-(d-ribitylamino)-4:5-dimethylazobenzene, 20 parts by weight of alloxantin, 30 parts by volume of normal alcoholic hydrogen chloride and 1 part by weight of palladised charcoal in 250 parts by volume of ethyl alcohol are stirred in a nitrogen atmosphere at a temperature of 60–70° C. until the dark bluish-green colour of the acidified solution of the azo compound disappears, and a yellow-brown solution is formed. The reaction is then completed by replacing the nitrogen with air and stirring the mixture for a further 4 hours at 60–70° C. The mixture is allowed to stand overnight at room temperature, and the precipitated crude riboflavin and catalyst are filtered. The former is then purified as in Example 1.

4. A mixture of 5.4 parts by weight of 2-(d-ribitylamino)-4:5-dimethylazobenzene, 20 parts by weight of alloxantin, 30 parts by volume of normal alcoholic hydrogen chloride, and 1 part by weight of palladised charcoal, are stirred in air with 150 parts by volume of ethyl alcohol at 60–70° C., until the bluish-green colour of the original mixture changes to a brown colour. After standing overnight at room temperature, the insoluble material is filtered, dissolved in ice-cold dilute caustic soda solution, filtered from catalyst, and the filtrate poured into excess dilute acetic acid. The resulting precipitate is boiled with water, cooled, filtered from insoluble material, and the filtrate concentrated. On cooling, riboflavin separates as an orange-yellow solid having a melting point of 278° C.

5. The preparation is carried out as described in Example 4 but without the addition of palladised charcoal. After completion of the reaction, the insoluble material is filtered off, dissolved in ice-cold dilute caustic soda, and poured into excess dilute acetic acid. Further purification can be carried out as described above.

6. A solution of 5.4 parts by weight of 2-(d-ribitylamino)-4:5 - dimethylazobenzene, and 30 parts by volume normal alcoholic hydrogen chloride in 100 parts by volume absolute alcohol, are added dropwise over a period of 2 hours to a mixture of 20 parts by weight alloxantin, and 0.5 part by weight palladised charcoal, stirred in an atmosphere of nitrogen at 60–70° C. The nitrogen is then replaced by air and the mixture stirred a further 5 hours at 60–70° C. After standing overnight, the insoluble material is filtered, dissolved in dilute caustic soda solution and poured into excess dilute acetic acid. Crude riboflavin is precipitated, which is purified as described in Example 4. A further amount of riboflavin can be obtained by concentrating the acetic acid mother liquors.

7. The preparation is carried out as in Example 6, but without addition of the palladised charcoal. After completion of the reaction, the isolation of the resulting crude riboflavin is carried out as in Example 5, and the purification as in Examples 4 and 6.

We claim:

1. A process for the manufacture of isoalloxazine derivatives which comprises heating a compound of the general formula

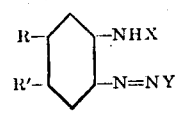

in which X is a polyhydroxyalkyl radical, Y is an aromatic nucleus, and R and R' are alkyl substituents in the 4 and 5 positions with a reduction product of alloxan selected from the group consisting of alloxantin and dialuric acid.

2. A process for the manufacture of isoalloxazine derivatives which comprises heating a compound of the general formula

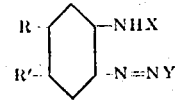

in which X is a polyhydroxyalkyl radical, Y is an aromatic nucleus, and R and R' are alkyl substituents in the 4 and 5 positions with alloxantin.

3. A process for the manufacture of isoalloxazine derivatives which comprises heating a compound of the general formula

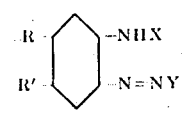

in which X is a polyhydroxyalkyl radical, Y is an aromatic nucleus, and R and R' are alkyl substituents in the 4 and 5 positions with dialuric acid.

4. A process for the manufacture of isoalloxazine derivatives which comprises heating a compound of the general formula

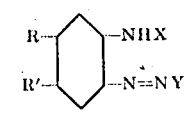

in which X is a polyhydroxyalkyl radical, Y is an aromatic nucleus, and R and R' are alkyl substituents in the 4 and 5 positions with a reduction product of alloxan selected from the group consisting of alloxantin and dialuric acid in the presence of palladised charcoal.

5. A process for the manufacture of isoalloxazine derivatives which comprises heating a compound of the general formula

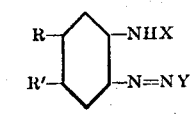

in which X is a polyhydroxyalkyl radical, Y is an aromatic nucleus, and R and R' are alkyl substituents in the 4 and 5 positions with a reduction product of alloxan selected from the group consisting of alloxantin and dialuric acid, in the presence of alcoholic hydrogen chloride.

6. A process for the manufacture of isoalloxazine derivatives which comprises heating 2-(d-ribitylamino)-4:5-dimethylazobenzene with a reduction product of alloxan reduced in the 5-position with a reduction product of alloxan selected from the group consisting of alloxantin and dialuric acid, in the presence of alcoholic hydrogen chloride and palladised charcoal, the reaction being commenced in the presence of nitrogen and the absence of oxygen, and being completed in the presence of oxygen.

FRANZ BERGEL.
AARON COHEN.
JOHN WYNNE HAWORTH.